United States Patent
Omi

(10) Patent No.: US 8,517,145 B2
(45) Date of Patent: Aug. 27, 2013

(54) X-RAY IMAGE PROCESSING APPARATUS FOR DECREASING NOISE OF AN X-RAY IMAGE, X-RAY IMAGE PROCESSING METHOD, PROGRAM AND STORAGE MEDIUM

(75) Inventor: Hiroyuki Omi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/549,594

(22) Filed: Jul. 16, 2012

(65) Prior Publication Data

US 2012/0275680 A1 Nov. 1, 2012

Related U.S. Application Data

(63) Continuation of application No. 12/367,229, filed on Feb. 6, 2009, now Pat. No. 8,249,325.

(30) Foreign Application Priority Data

Feb. 12, 2008 (JP) .................................. 2008-031023

(51) Int. Cl.
*G06K 9/00* (2006.01)
(52) U.S. Cl.
USPC ........................................................ 182/132
(58) Field of Classification Search
USPC .......... 382/128, 132; 250/370.09; 378/98.11
See application file for complete search history.

(56) References Cited

U.S. PATENT DOCUMENTS 6,751,289 B2 * 6/2004 Aoki et al. .................... 378/98.7

FOREIGN PATENT DOCUMENTS

JP 10-208016 A 8/1998
JP 2004-201784 A 7/2004

OTHER PUBLICATIONS

The above references were cited in a Aug. 24, 2012 Japanese Office Action, of which is enclosed without English Translation, that issued in Japanese Patent Application No. 2008-031023.

* cited by examiner

*Primary Examiner* — Thanh Luu
(74) *Attorney, Agent, or Firm* — Cowan, Liebowitz & Latman, P.C.

(57) ABSTRACT

An X-ray image processing apparatus includes a calculating unit adapted to calculate the noise amount of a sensor on the basis of a difference value of a plurality of dark images acquired at different timings by the sensor when no X-rays are irradiated, a changing unit adapted to change a predetermined parameter for processing an X-ray image acquired by the sensor when X-rays are irradiated, in order to prevent the noise amount from being superposed on the X-ray image, and an image processing unit adapted to perform image processing on the X-ray image on the basis of the changed parameter.

6 Claims, 11 Drawing Sheets

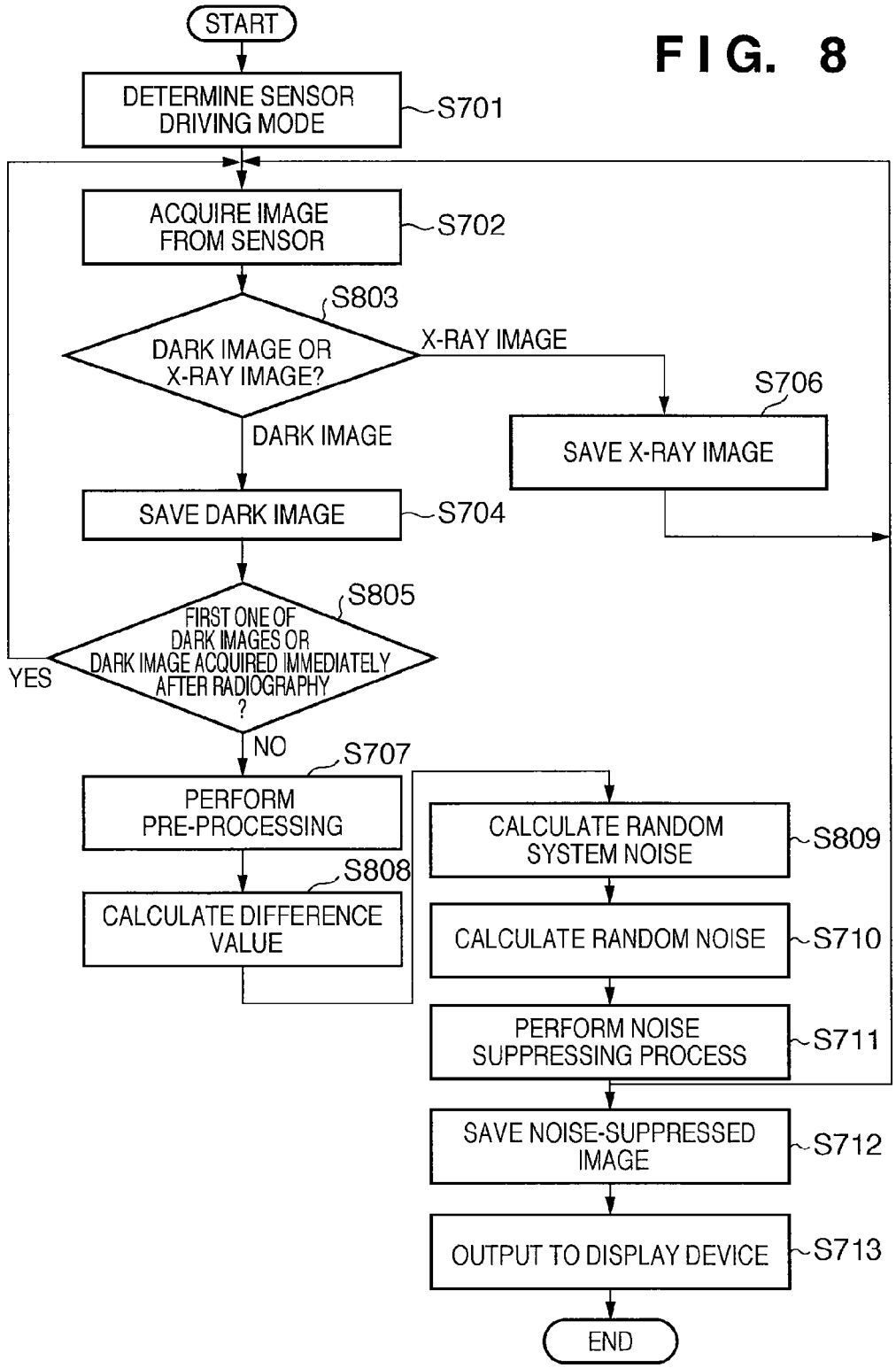

X-RAY IMAGE PROCESSING APPARATUS FOR DECREASING NOISE OF AN X-RAY IMAGE, X-RAY IMAGE PROCESSING METHOD, PROGRAM AND STORAGE MEDIUM

CROSS-REFERENCE TO RELATED APPLICATIONS

This application is a continuation of application Ser. No. 12/367,229, filed Feb. 6, 2009 the entire disclosure of which is hereby incorporated by reference.

BACKGROUND OF THE INVENTION

1. Field of the Invention

The present invention relates to an X-ray image processing technique.

2. Description of the Related Art

An X-ray fluoroscopic image has a large amount of random noise because radiography is performed with a very low dose from the viewpoint of exposure. Accordingly, performing a noise suppressing process in X-ray fluoroscopic imaging is very important to increase the clearness of a diagnostic image.

To suppress noise, it is necessary to accurately estimate the noise amount on an image. If the noise suppressing process is carelessly performed, the edges of an X-ray fluoroscopic image may be blurred, or the noise cannot be suppressed at all.

As a technique of estimating an accurate noise amount on an image, an object in each motion image frame is analyzed and the noise amount of each object is estimated in Japanese Patent No. 3762725. Although Japanese Patent No. 3762725 takes a general video camera application as an example, the same effect may be obtained in an X-ray image. The larger the thickness of an object, the more difficult it becomes to transmit X-rays. Since this reduces the X-ray dose reaching an X-ray receiving sensor, an image having a large amount of noise relative to the signal value is obtained. Accordingly, the method of estimating the noise amount of each object is effective.

The random noise of X-rays is classified into random quantum noise $N_q$ caused by X-rays and random system noise $N_s$ as electrical noise in an X-ray receiving sensor. These two types of random noise are added as random noise $\sigma(X)$ onto an X-ray image. $\sigma(X)$ is represented by $$\sigma(X) = \sqrt{N_q^2 + N_s^2} \quad (1)$$

$$N_q = K_q \cdot (X)^{1/2} \quad (2)$$

FIG. 3 shows the above equations as the relationship between the X-ray dose (X-ray irradiation intensity) and X-ray random noise amount. This relationship shows that when the dose of an X-ray image is low, the influence of the random system noise is larger than that of the random quantum noise. The technique disclosed in Japanese Patent No. 3762725 can estimate only the random quantum noise caused by X-rays because the method is object analysis. Therefore, Japanese Patent Laid-Open No. 2005-006792 has proposed a detection method of detecting the random system noise by using an AC magnetic field detector. In addition, Japanese Patent Laid-Open No. 2004-023764 has proposed a method of storing a reference noise pattern in accordance with radiography conditions, and loading the noise pattern in accordance with the radiography conditions.

To increase the clearness of an X-ray image, however, it is necessary to accurately obtain the noise amount of the image, and process the X-ray image in accordance with the noise amount.

SUMMARY OF THE INVENTION

The present invention has been made in consideration of the above situation, and has as its object to provide an X-ray image processing technique that takes account of the influence of the random system noise by detecting the random system noise by calculating it by using a dark image for each radiographed image.

According to one aspect of the present invention, there is provided an X-ray image processing apparatus comprising: a calculating unit adapted to calculate a noise amount of an X-ray receiving unit on the basis of a difference value of a plurality of dark images acquired at different timings by the X-ray receiving unit when no X-rays are irradiated, a changing unit adapted to change a predetermined parameter for processing an X-ray image acquired by the X-ray receiving unit when X-rays are irradiated, in order to prevent the noise amount from being superposed on the X-ray image, and an image processing unit adapted to perform image processing on the X-ray image on the basis of the parameter changed by the changing unit.

According to another aspect of the present invention, there is provided an X-ray image processing method of an X-ray image processing apparatus, comprising: a calculating step of calculating a noise amount of an X-ray receiving unit of the X-ray image processing apparatus on the basis of a difference value of a plurality of dark images acquired at different timings by the X-ray receiving unit when no X-rays are irradiated; a changing step of changing a predetermined parameter for processing an X-ray image acquired by the X-ray receiving unit when X-rays are irradiated, in order to prevent the noise amount from being superposed on the X-ray image, and an image processing step of performing image processing on the X-ray image on the basis of the parameter changed in the changing step.

The present invention makes it possible to perform highly accurate X-ray image processing that calculates the random system noise by using a dark image, thereby suppressing the influence of the random system noise.

Further features of the present invention will become apparent from the following description of exemplary embodiments with reference to the attached drawings.

BRIEF DESCRIPTION OF THE DRAWINGS

FIG. 8 is a flowchart for explaining the operation procedure of an X-ray image processing apparatus;

DESCRIPTION OF THE EMBODIMENTS

Preferred embodiments of the present invention will be exemplarily explained in detail below with reference to the accompanying drawings. However, constituent elements described in these embodiments are merely examples, and the technical scope of the present invention is determined by the scope of appended claims, and is not limited by the following individual embodiments.

First Embodiment

In this embodiment, an arrangement in which the random system noise is detected by calculating it by using two dark images for each radiographed image will be described.

The dark image is an image acquired by an X-ray receiving sensor functioning as an X-ray receiving unit when no X-rays are irradiated. The dark image is also called a dark current image, FPN (Fixed Pattern Noise) image, or offset image. On the other hand, an X-ray image is an image acquired by the sensor when X-rays are irradiated.

Figure 4:
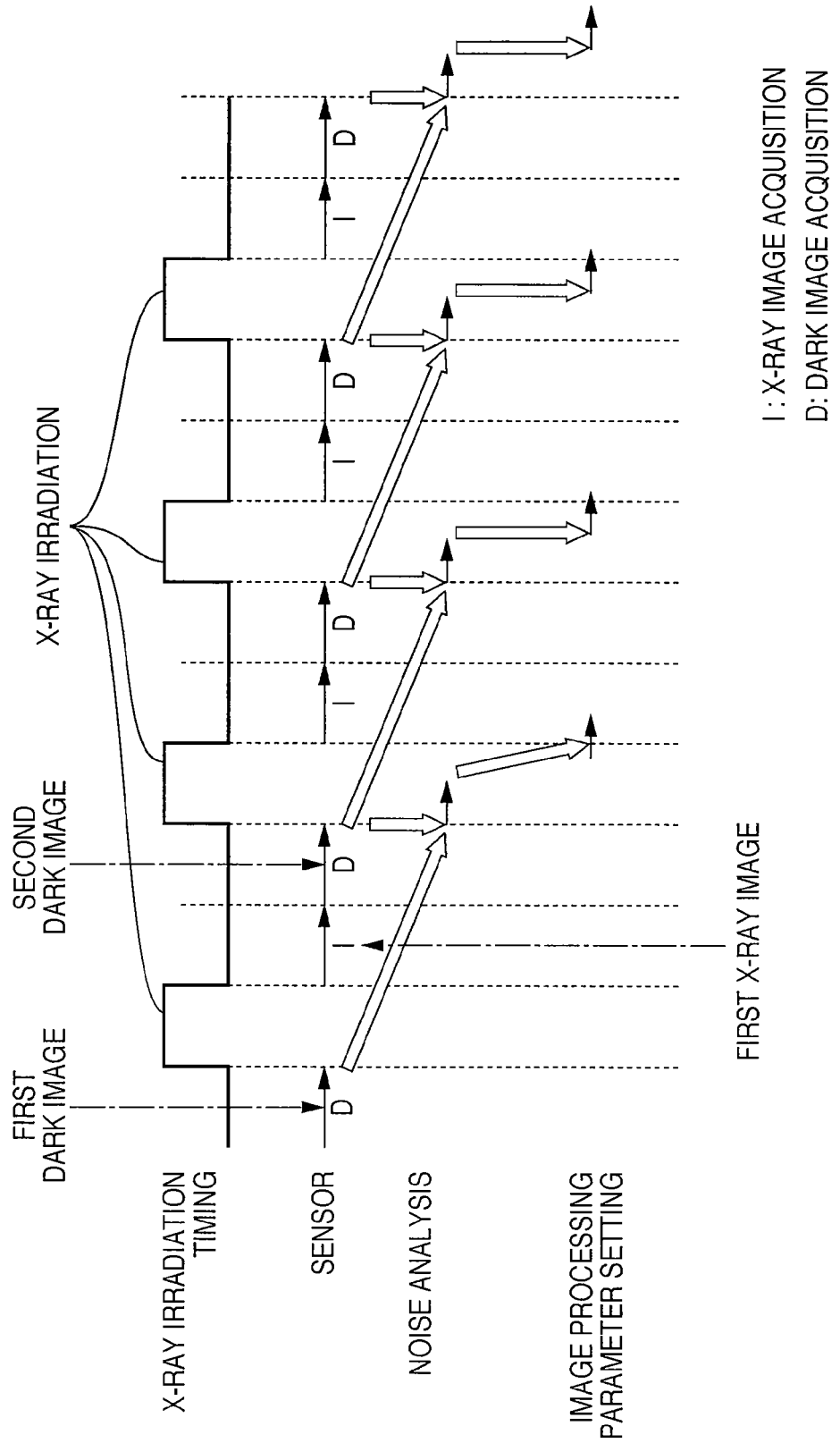
FIG. 4 is a timing chart showing the timings of X-ray irradiation, acquisition of an X-ray image by a sensor, analysis of noise contained in the X-ray image, and image processing parameter setting.

FIG. 4 is a timing chart showing the timings of X-ray irradiation, acquisition of an X-ray image by an X-ray receiving sensor (to be also simply referred to as a "sensor" hereinafter), analysis of noise contained in the X-ray image, and image processing parameter setting.

As shown in FIG. 4, the X-ray receiving sensor acquires image data in the order of the first dark image obtained before the start of X-ray irradiation, the first X-ray image obtained when X-rays are irradiated, and the second dark image obtained after the end of X-ray irradiation. The random system noise amount of each X-ray image is calculated by using the difference value between the two dark images (first and second dark images) sandwiching the first X-ray image. Since the dark image is an image radiographed while no X-rays are irradiated, no random quantum noise caused by X-rays exists, and only the random system noise exists in the dark image.

The random system noise is detected by analyzing the dark image. The two dark images are used in order to remove the fixed pattern noise of the X-ray receiving sensor. The fixed pattern noise can be removed by calculating the difference. The dark image obtained immediately after an X-ray image is radiographed may become an image in which the afterimage of the X-ray image remains. To suppress the influence of the afterimage, therefore, X-ray images and dark images are radiographed in accordance with, e.g., a timing chart shown in FIG. 5.

Figure 5:
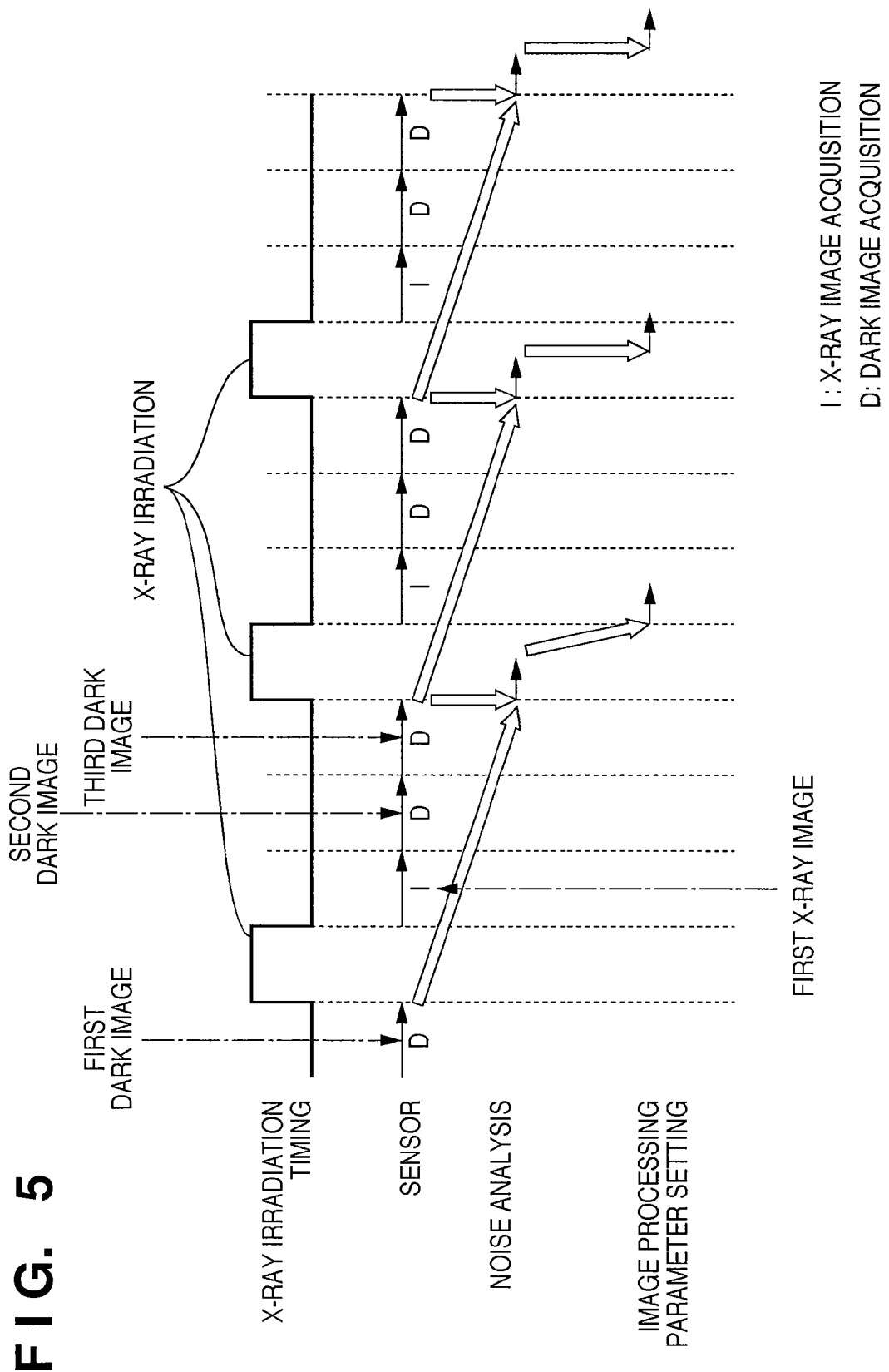
FIG. 5 is a timing chart showing the timings of X-ray irradiation, acquisition of an X-ray image by a sensor, analysis of noise contained in the X-ray image, and image processing parameter setting.

In the timing chart shown in FIG. 5, the X-ray receiving sensor acquires image data in the order of the first dark image, first X-ray image, second dark image, and third dark image. Noise analysis is performed on the basis of this radiography result, and image processing parameters are set. The third dark image is a dark image acquired by a sensor 1012 when a predetermined time has elapsed after the acquisition of the second dark image.

There is also a method using a high-pass filter in order to eliminate the influence of the X-ray afterimage from the difference value between the two dark images. It is also possible to segment a difference value image obtained as the difference value of a plurality of dark images into a plurality of blocks (partial areas), and calculate the noise amount on the basis of noise information of a partial area in which the average value of pixels resulting from the X-ray afterimage contained in the area is minimum. In a timing chart shown in FIG. 6, two dark images (the fourth and fifth dark images) are radiographed before the start of X-ray irradiation (before the start of radiography), and two dark images (the sixth and seventh dark images) are radiographed after the end of X-ray irradiation (after the end of radiography). It is also effective to detect the random system noise immediately before and after radiography, predict (interpolate) the random system noise amount during radiography, and perform image processing by changing parameters on the basis of the interpolation result. Since an image obtained by a larger noise suppressing effect is saved, the clearness can be further improved when a doctor performs diagnosis by cineloop reproduction or the like.

Figure 1:
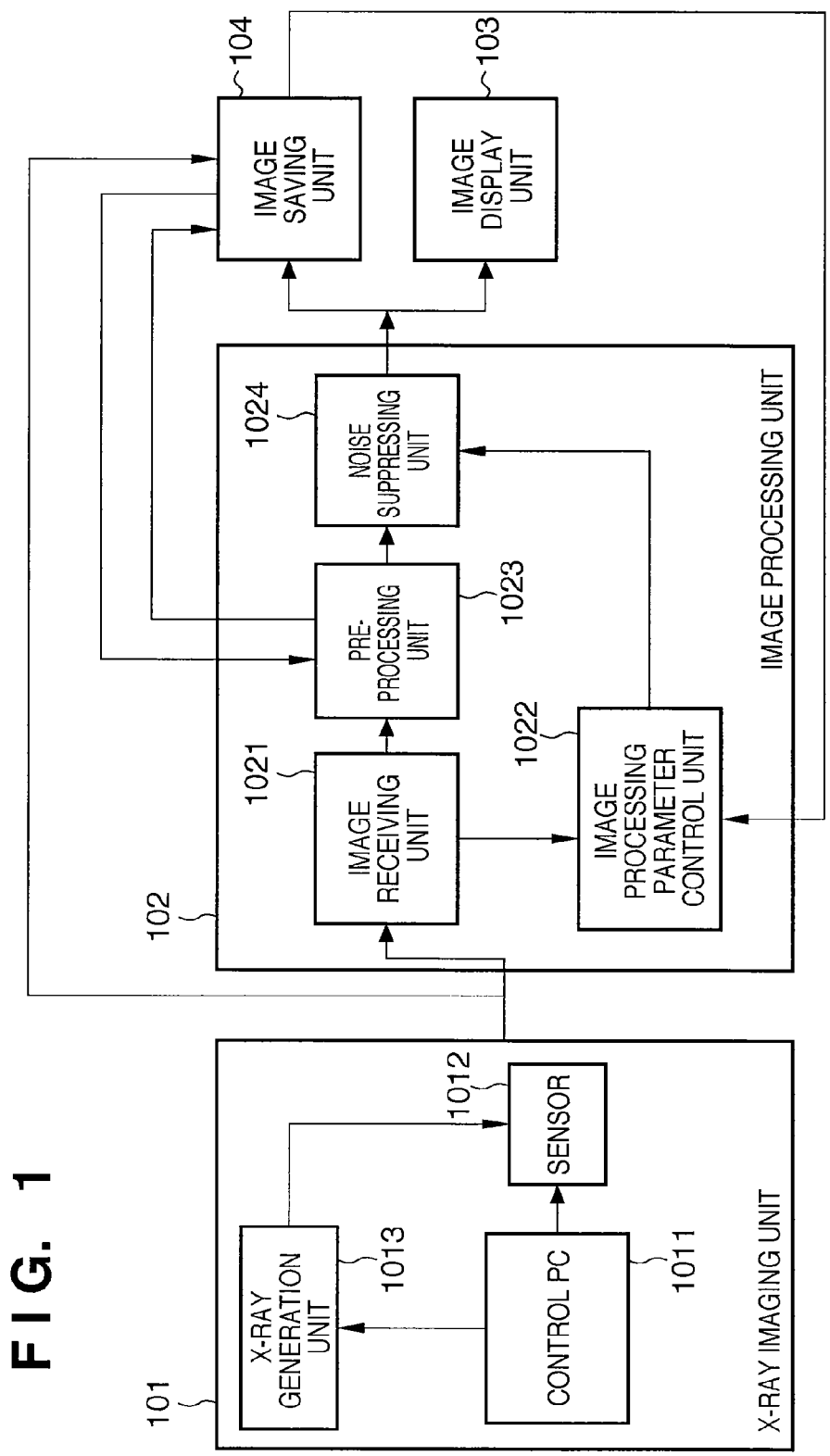
FIG. 1 is a view for explaining the functional arrangement of an X-ray fluoroscopic apparatus according to an embodiment of the present invention.

The functional configuration of an X-ray fluoroscopic apparatus according to the embodiment of the present invention will be explained below. FIG. 1 is a block diagram showing an outline of the functional arrangement of the X-ray fluoroscopic apparatus.

The X-ray fluoroscopic apparatus includes an X-ray imaging unit 101, image processing unit 102, image display unit 103, and image saving unit 104. The X-ray imaging unit 101 includes the sensor 1012, an X-ray generation unit 1013, and a control PC 1011 functioning as a control unit for controlling the operations of these components. The image processing unit 102 includes an image receiving unit 1021, image processing parameter control unit 1022, pre-processing unit 1023, and noise suppressing unit 1024. The image processing unit 102 has the configuration of the X-ray image processing apparatus according to the embodiment of the present invention.

The image receiving unit 1021 can receive an image transmitted from the X-ray imaging unit 101, and an input sensor driving signal. On the basis of the sensor driving signal, the image receiving unit 1021 determines whether the image transmitted from the X-ray imaging unit 101 is an X-ray image or dark image. In accordance with the transmitted image, the image receiving unit 1021 outputs the transmitted image to one or both of the image processing parameter control unit 1022 and pre-processing unit 1023.

Also, the X-ray imaging unit 101 transmits an X-ray image and dark image to the image saving unit 104, and the image saving unit 104 saves the transmitted images. The image processing parameter control unit 1022 receives an input dark image from the image receiving unit 1021, and also receives another input dark image from the image saving unit 104. The image processing parameter control unit 1022 calculates the noise amount from the difference between the two types of dark images. On the basis of this noise amount, the image processing parameter control unit 1022 sets predetermined parameters (control parameters) for processing an X-ray image, and outputs the parameters to the noise suppressing unit 1024. The image processing parameter control unit 1022 functions as a changing unit for changing the predetermined parameters for processing an X-ray image, so as to suppress superposition of the calculated noise amount.

The pre-processing unit 1023 performs pre-processing necessary before a noise suppressing process by using the dark image or X-ray image input from the image receiving unit 1021 and the dark image or X-ray image input from the image saving unit 104. The pre-processing unit 1023 outputs the pre-processed image to the noise suppressing unit 1024. The pre-processed image is also output to the image saving unit 104 and saved in it.

The noise suppressing unit 1024 receives the input pre-processed image from the pre-processing unit 1023 and the input image processing parameters from the image processing parameter control unit 1022, and performs the noise suppressing process. The noise suppressing unit 1024 outputs the noise-suppressed image having undergone the noise suppressing process to the image display unit 103 and image saving unit 104. The image display unit 103 receives the noise-suppressed image and displays it on a display device. The image saving unit 104 receives and saves the noise-suppressed image. The image processing unit 102 can also reprocess the image once saved in the image saving unit 104.

Figure 2:
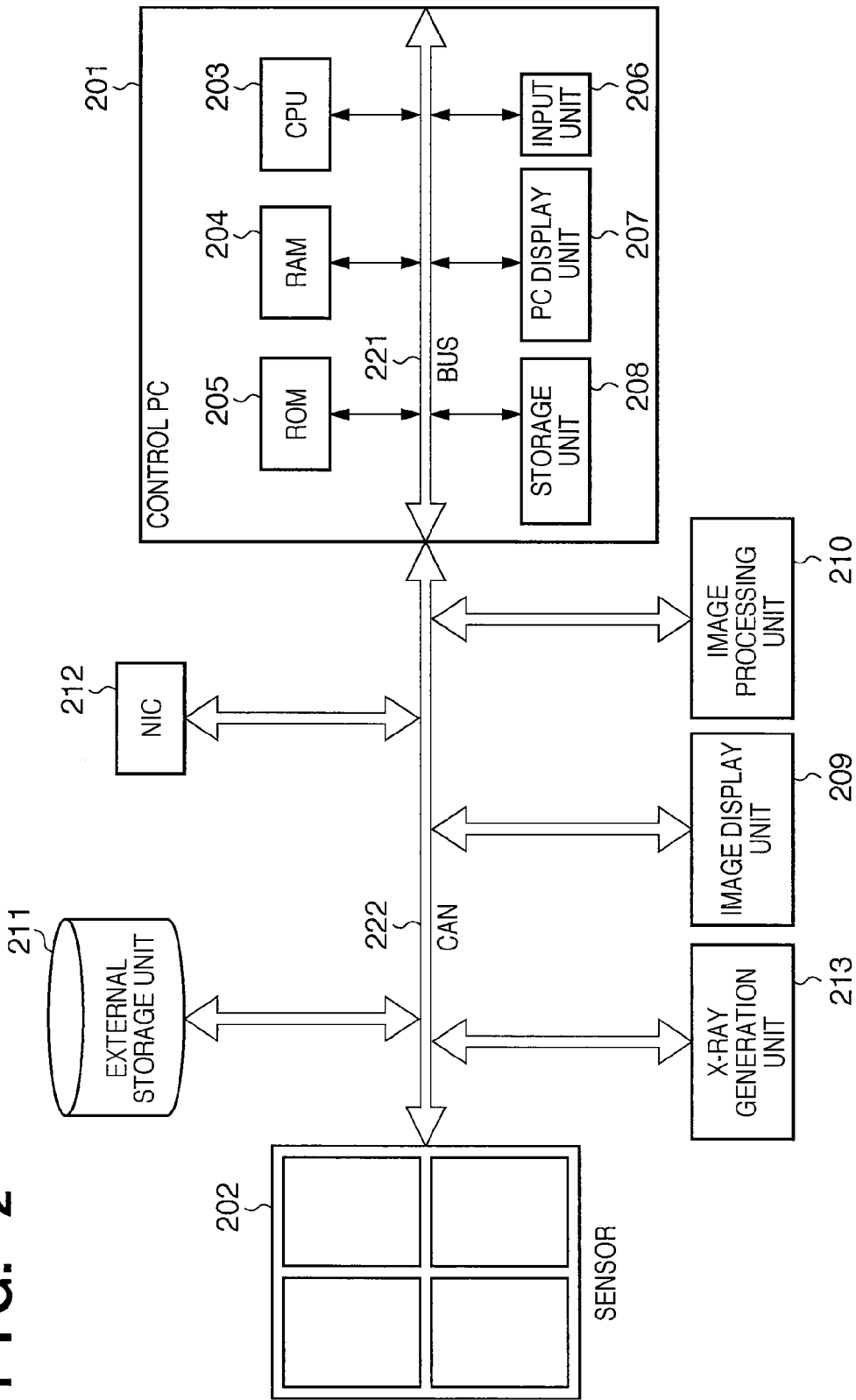
FIG. 2 is a view for explaining the hardware configuration of the X-ray fluoroscopic apparatus.
Figure 3:
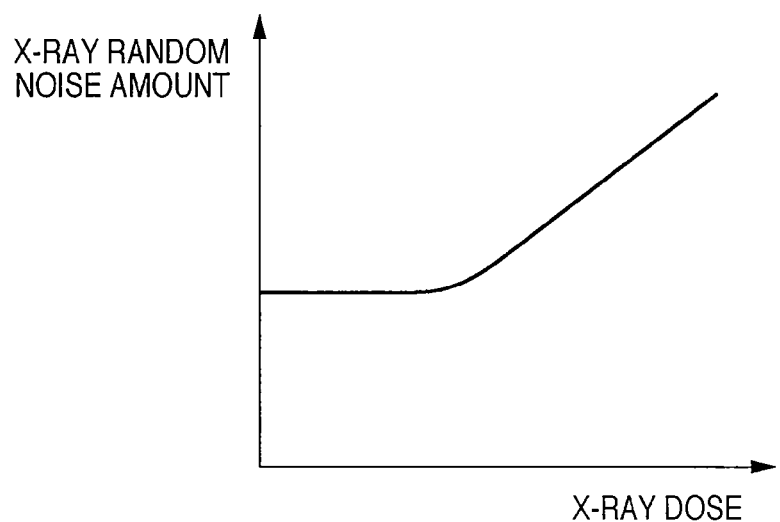
FIG. 3 is a graph showing the relationship between the X-ray dose and X-ray random noise amount.

FIG. 2 shows a hardware configuration for implementing the arrangement shown in FIG. 1 on an information processing apparatus (PC). A control PC 201, sensor 202, and X-ray generation unit 213 are connected via a CAN (Controller Area Network) 222 capable of bidirectional information transmission as a signal line. Note that the signal line may also be an optical fiber or the like instead of the CAN. The CAN 222 is also connected to an image processing unit 210, an image display unit 209, an external storage unit 211 including, e.g., a hard disk drive (HDD), and a network interface unit (NIC) 212. The control PC 201 includes a CPU 203, RAM 204, ROM 205, input unit 206, PC display unit 207, and storage unit 208. These components are connected via a bus 221. The control PC 201 transmits commands to the sensor 202, image processing unit 210, and the like. The control PC 1011 shown in FIG. 1 is equivalent to the control PC 201 shown in FIG. 2. The storage unit 208 stores the processing contents of each imaging mode as a software module. This software module is loaded into the RAM 204 and executed by a designating unit (not shown). The sensor 1012 shown in FIG. 1 is equivalent to the sensor 202 shown in FIG. 2. The X-ray generation unit 1013 shown in FIG. 1 is equivalent to the X-ray generation unit 213 shown in FIG. 2.

The image processing unit 102 has a portion which is mounted as an image processing board, and a portion whose processing contents are stored as a software module in the storage unit 208, and loaded into the RAM 204 and executed by the designating unit (not shown). The image display unit 103 shown in FIG. 1 is equivalent to the image display unit 209 shown in FIG. 2. The image saving unit 104 shown in FIG. 1 is equivalent to the external storage unit 211 or RAM 204 shown in FIG. 2.

Figure 7:
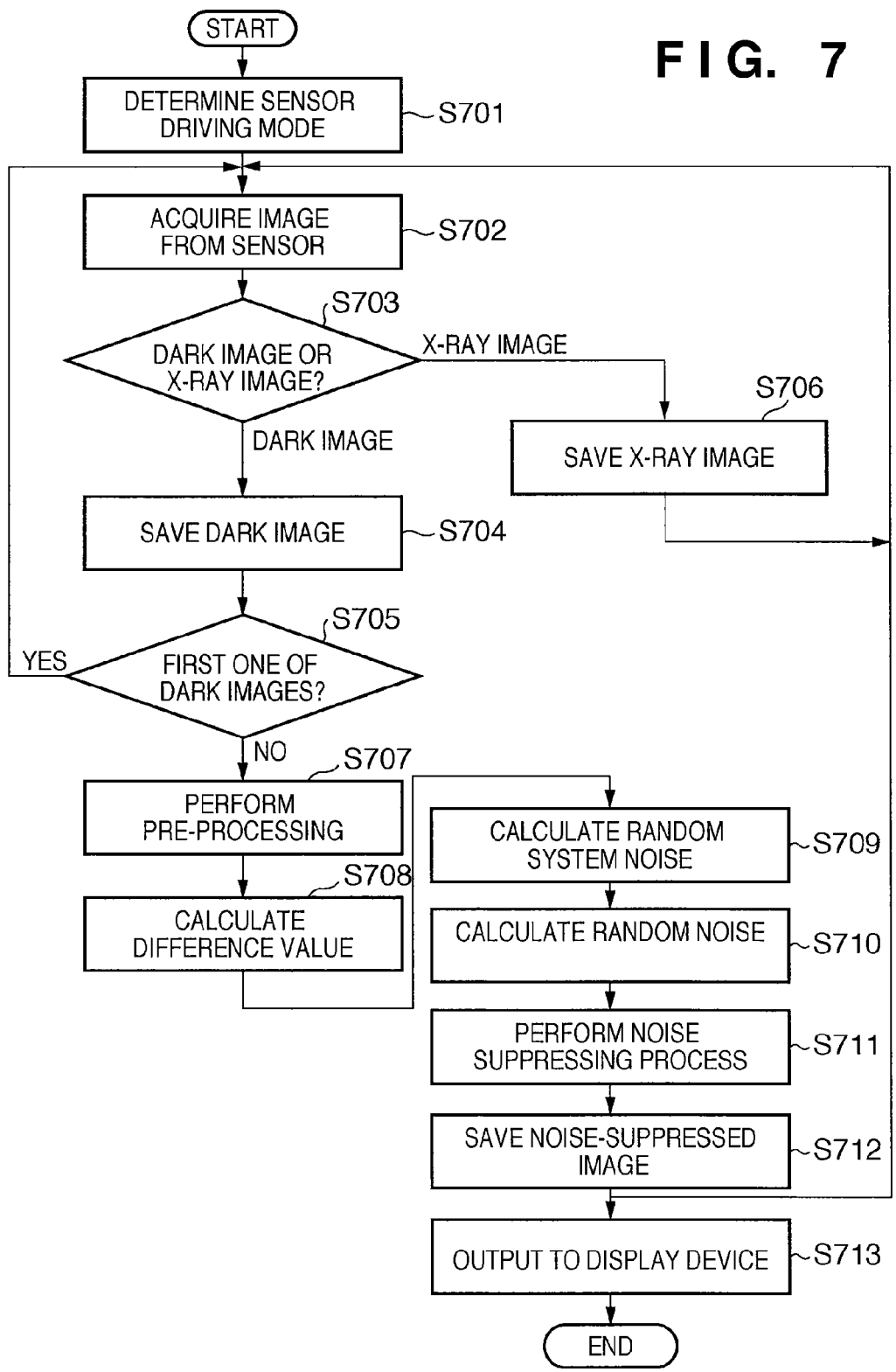
FIG. 7 is a flowchart for explaining the operation procedure of an X-ray image processing apparatus.

The above-mentioned arrangement is of course not limited to the image processing apparatus (PC), and can also be implemented by using dedicated hardware. For example, all the units shown in FIG. 1 can also be implemented as dedicated hardware. The operation of the X-ray image processing apparatus will be explained below with reference to the block diagram shown in FIG. 1, the timing chart shown in FIG. 4, and a flowchart shown in FIG. 7.

First, in step S701, the X-ray imaging unit 101 determines the driving mode of the sensor 1012. As shown in FIG. 4, the sensor driving mode is the driving pattern of the sensor 1012, which indicates how to match the image acquisition timing of the sensor 1012 with the timing of X-ray irradiation. In this embodiment as shown in FIG. 4, the sensor 1012 acquires an X-ray image after X-rays are irradiated, and acquires a dark image after the X-ray image is acquired.

The X-ray imaging unit 101 sets the driving timings (driving pattern) of the sensor 1012 in the control PC 1011 so that the sensor 1012 drives at the timings shown in FIG. 4. The X-ray imaging unit 101 also sets the X-ray irradiation timings in the control PC 1011 so that the X-ray generation unit 1013 irradiates X-rays at the timings shown in FIG. 4.

In step S702, the sensor 1012 acquires an image in synchronism with a signal (sensor driving signal) for controlling driving of the sensor, which is output from the control PC 1011. The sensor 1012 outputs the acquired image (sensor acquired image) and sensor driving signal to the image processing unit 102.

In step S703, the image processing unit 102 determines whether the sensor acquired image is an X-ray image or dark image, and switches processing steps in accordance with the determination result.

If it is determined in step S703 that the acquired image is a dark image, the process advances to step S704. As shown in FIG. 4, the sensor 1012 acquires a dark image (the first dark image) once before X-rays are irradiated (before X-ray irradiation). The image processing unit 102 sends the dark image (first dark image) transmitted from the sensor 1012 to the image saving unit 104, and saves the dark image in a dark image saving unit of the image saving unit 104 (S704).

In step S705, the image receiving unit 1021 forming the image processing unit 102 determines whether the input dark image is the first one of dark images after radiography is started. The image receiving unit 1021 can count the number of times of reception of the sensor driving signal. On the basis of the count of the number of times of reception, the image receiving unit 1021 determines whether the input dark image is the first or second one of dark images. If the dark image is the first one of dark images (YES in S705), the process returns to step S702 to repeat the same processing. The sensor 1012 reacquires an image (S702), and outputs the acquired image to the image processing unit 102. Referring to FIG. 4, the image acquired next by the sensor 1012 is an X-ray image (the first X-ray image). The image receiving unit 1021 saves the received X-ray image (first X-ray image) in an X-ray image saving unit of the image saving unit 104 (S706). After that, the process returns to step S702 to repeat the same processing.

On the other hand, if it is determined in step S703 that the sensor acquired image is a dark image, the process advances to step S704, and the dark image is saved in the dark image saving unit of the image saving unit 104. In this step, the second dark image is saved so as not to overwrite the first dark image.

If the image processing unit 102 determines in step S705 that the input dark image is not the first one of dark images, i.e., the input dark image is the second one of dark images, the process advances to step S707. Since the input dark image is the second one of dark images acquired after X-rays are irradiated (after X-ray irradiation), the image receiving unit 1021 outputs the second dark image to the image processing parameter control unit 1022 and pre-processing unit 1023.

In step S707, the pre-processing unit 1023 receives the second dark image and the first X-ray image saved in the X-ray image saving unit, and performs pre-processing. This pre-processing is to remove the fixed pattern noise of the sensor 1012. The input images to the pre-processing unit 1023 are the first X-ray image and second dark image, and the noise pattern (fixed pattern noise) fixed in the sensor is obtained by subtracting the second dark image from the first X-ray image (by calculating the difference). This fixed noise pattern can be removed by correcting the first X-ray image so as to cancel the fixed pattern noise. Although the second dark image is used as a dark image for obtaining the fixed pattern noise, the dark image (first dark image) acquired immediately before radiography of the X-ray image can also be used. In this case, not the second dark image but the first dark image is input from the dark image saving unit to the image processing unit. The pre-processing unit 1023 outputs the pre-processed image.

In step S708, the image processing parameter control unit 1022 receives the second dark image and the first dark image from the image saving unit 104, and calculates the random system noise. More specifically, the difference between the first and second dark images is calculated. When the difference is calculated, the fixed pattern noise added to the first and second images is deleted, and only random noise remains.

In step S709, the image processing parameter control unit 1022 calculates the standard deviation of the whole difference image, thereby calculating the random system noise. The calculated random system noise is obtained from the difference between the first and second dark images, and hence is twice the original random system noise. However, the fixed pattern noise is removed from the pre-processed image as an object of the noise suppressing process by calculating the difference from the dark image, so the random system noise is doubled during the course of the processing. Accordingly, the image processing parameter control unit 1022 directly outputs the obtained random system noise amount to the noise suppressing unit 1024. This random system noise amount is a parameter in the noise suppressing process.

Then, in step S710, the noise suppressing unit 1024 calculates the random noise amount from the pre-processed image. The random noise amount is calculated by using equations (1) and (2) presented earlier. The random quantum noise amount is calculated by inputting the luminance value of each pixel of the pre-processed image as a luminance value X of equation (2). The random noise amount is calculated by inputting, to equation (1), the random quantum noise amount calculated from equation (2) and the random system noise amount output from the image processing parameter control unit 1022. It is also possible to increase the processing speed by tabulating equations (1) and (2) instead of actually calculating them.

In step S711, the noise suppressing unit 1024 performs a noise suppressing process by using the obtained random noise amount. The noise suppressing process is practically a filtering process using a recursive filter. The recursive filter is represented by $$Y(n) = (1-a) \cdot X(n) + a \cdot Y(n-1) \quad (3)$$

where X(n) is an input value to the recursive filter in the nth frame, Y(n) is an output value from the recursive filter in the nth frame, and a is a feedback coefficient. When the feedback coefficient is increased, the noise suppressing power can be increased, but an afterimage is undesirably generated in a portion where there is a motion. Accordingly, it is important and difficult to discriminate between noise and a motion in the recursive filter. Therefore, the random noise amount (defined as an estimated noise amount) calculated by the noise suppressing unit 1024 is used as a noise suppressing process parameter, and the noise suppressing process is controlled by using this parameter as a threshold between noise and a motion. To discriminate between noise and a motion, the estimated noise amount is compared with the difference value between a preceding frame image X(n−1) and present frame image X(n). Low-frequency components are removed from the difference image, and only the random noise and a motion remain in the image. The noise and motion are discriminated in this image. If the difference value is larger than the estimated noise amount, the image is regarded as a motion. If the difference value is smaller than the estimated noise amount, the image is regarded as noise. The feedback coefficient is decreased for a pixel found to be a motion, and increased for a pixel found to be noise. This makes it possible to perform processing strong against a motion and having a high noise suppressing power. This control is represented by $$a = a_{ini} \left( \sqrt{2} \cdot \sigma(X(n)) > X(n) - X(n-1) \right) \quad (4)$$

$$a = a_{ini} \cdot \frac{\sigma(X(n))}{Y(n-1) - X(n)} \left( \sqrt{2} \cdot \sigma(X(n)) \le X(n) - X(n-1) \right)$$

where $a_{ini}$ is an initial set value of the feedback coefficient a, and $\sigma(X(n))$ is the random system noise amount of X(n).

The estimated noise amount is compared with a value multiplied by $\sqrt{2}$ because the estimated noise amount is compared with the difference value. When comparing the estimated noise amount with an image obtained by calculating no difference (e.g., when comparing the estimated noise amount with the X(n) image itself), multiplication by $\sqrt{2}$ is unnecessary. By thus calculating the random system noise for each frame, it is possible to set an optimum noise suppressing process parameter and perform an optimum noise suppressing process for each frame.

A spatial filter is used as a practical noise suppressing process of the noise suppressing unit 1024. An example of the spatial filter is an ϵ filter. The ϵ filter is represented by $$Ep(x) = x - \sum_{i=1}^{M} w(i) \cdot F(x - x_i) \quad (5)$$

$$w(i) = s(i) = h(i) \cdot \frac{F(x - x_i)}{x - x_i} \text{ (i is not a central pixel)}$$

$$w(i) = 1 - \sum_{i=1}^{M} s(i) \text{ (i is a central pixel)}$$

where Ep(x) is an ϵ filter output value with respect to an input pixel value x, w(i) is a filter coefficient, and h(i) is an initial value of the filter coefficient. For example, a filter coefficient having the noise suppressing power, such as a filter coefficient of a 3×3 smoothing filter in which all elements are ⅑, is set as h(i). The spatial filter suppresses noise from nearby pixels, and hence blurs the edge if there is an edge component. If the noise suppressing power is decreased in order to prevent the edge blur, noise cannot be suppressed any longer. Accordingly, it is important and difficult to discriminate between noise and the edge in the spatial filter. Therefore, the random noise amount (defined as the estimated noise amount) calculated by the noise suppressing unit 1024 is used as a noise suppressing process parameter, and the noise suppressing process is controlled by using this parameter as a threshold between noise and the edge. The ϵ filter compares a target pixel with a peripheral pixel, and determines the filter coefficient and filter suppressing power. More specifically, the ϵ filter discriminates between noise and the edge on the basis of the difference value between the target pixel and peripheral pixel, and determines the filter coefficient. The ϵ filter uses the estimated noise amount as a threshold between noise and the edge, and discriminates between the edge and noise by comparing the difference value between the target pixel and peripheral pixel with the estimated noise amount. F(X) of equation (5) is this function. The contents of the function are represented by $$F(X-X_i)=X-X_i(X-X_i\leq\sqrt{2}\cdot\sigma(X))\ F(X-X_i)=\sqrt{2}\cdot\sigma(X)(X-X_i>\sqrt{2}\cdot\sigma(X)) \qquad (6)$$

If the difference value is larger than the estimated noise amount, the pixel is regarded the edge. When the filter coefficient w(i) is calculated by equation (5) by using the value of equation (6) when the pixel is the edge, the filter coefficient w(i) for the pixel decreases. Consequently, the value of the central pixel of the filter coefficient w(i) increases. That is, for a pixel found to be the edge, the dependence of the filter coefficient on the central pixel is increased, and the smoothness is decreased, thereby saving the edge. If the difference value is smaller than the estimated noise amount, the pixel is regarded as noise. When the filter coefficient w(i) is calculated by equation (5) by using the value of equation (6) when the pixel is noise, the filter coefficient w(i) for the pixel is the initial coefficient h(i). That is, the noise is suppressed by selecting a coefficient having a high smoothness. By thus determining the filter coefficient, it is possible to perform processing strong against the edge and having a high noise suppressing power.

By calculating the random system noise for each frame as described above, it is possible to set an optimum noise suppressing process parameter and perform an optimum noise suppressing process for each frame. The noise suppressing unit 1024 can three-dimensionally process pixels by connecting a time filter and spatial filter in series, and can also selectively process each pixel by connecting these filters in parallel. It is of course also possible to perform processing by using only one of these connections.

In step S712, the image processing unit 102 outputs the noise-suppressed image to the image saving unit 104, and the image saving unit 104 saves the noise-suppressed image.

In step S713, the image processing unit 102 outputs the noise-suppressed image to the image display unit 103, and the image display unit 103 displays the noise-suppressed image on the display device. The same processing is continuously performed on succeeding images acquired by the sensor 1012, and noise-suppressed images are displayed and saved.

By thus detecting the random system noise of each radiographed image, it is possible to perform an appropriate noise suppressing process on each radiographed image, and generate a highly clear image.

Second Embodiment

The second embodiment is almost the same as the first embodiment in arrangements and procedures of an X-ray imaging unit 101, image processing unit 102, image display unit 103, and image saving unit 104. The difference from the first embodiment is the method of detecting the random system noise performed in an image processing parameter control unit 1022 of the image processing unit 102.

In step S708 of this embodiment, the image processing parameter control unit 1022 calculates the difference between the first and second dark images. The afterimage of an X-ray image may remain in the second dark image acquired immediately after the X-ray image. Accordingly, the afterimage may remain in this difference image in addition to the random system noise. If the afterimage component remains, an error occurs in the calculation result of the standard deviation, and no accurate random system noise is obtained.

As processing corresponding to step S709, therefore, the image processing parameter control unit 1022 executes a filtering process on the difference image in order to remove the afterimage component. Comparing the frequency components of the afterimage with those of the random system noise exhibits that the afterimage component has low-frequency components and the random system noise has high-frequency components. Accordingly, the image processing parameter control unit 1022 executes a high-pass filtering process. The random system noise is obtained by calculating the standard deviation of the whole difference image having undergone the high-pass filtering process. The image processing parameter control unit 1022 outputs the thus obtained random system noise amount to a noise suppressing unit 1024.

This embodiment can accurately detect the random system noise even when the afterimage component remains in the dark image.

Third Embodiment

The third embodiment is almost the same as the first embodiment in arrangements and procedures of an X-ray imaging unit 101, image processing unit 102, image display unit 103, and image saving unit 104. The difference from the first embodiment is the method of detecting the random system noise, which is performed in an image processing parameter control unit 1022 of the image processing unit 102.

In step S708 of this embodiment, the image processing parameter control unit 1022 calculates the difference between the first and second dark images.

Then, in step S709, the image processing parameter control unit 1022 segments the difference image into a plurality of blocks, and calculates the average luminance value of each block. Since the random system noise distributes with an average value of 0, the standard deviation of a block whose average value is closest to 0 is calculated and used as the random system noise of the whole image. The difference image may be segmented into blocks at equal intervals, and may also be segmented by area recognition from an X-ray image acquired by the sensor immediately before segmentation. It is also possible to calculate the mean of the standard deviations of a plurality of blocks having average values close to 0, and use the mean as the random system noise of the entire image. The image processing parameter control unit 1022 outputs the thus obtained random system noise amount to a noise suppressing unit 1024.

This embodiment can accurately detect the random system noise even when the afterimage component remains in the dark image.

Fourth Embodiment

The fourth embodiment is almost the same as the first embodiment in arrangements and procedures of an X-ray imaging unit 101, image processing unit 102, image display unit 103, and image saving unit 104. The differences from the first embodiment are the driving mode of a sensor 1012 and an input image to an image processing parameter control unit 1022.

As shown in FIG. 5, the driving mode of the fourth embodiment differs from that of the first embodiment in that the third dark image is acquired after the second dark image is acquired. The operation of the image processing parameter control unit 1022 having received the third dark image will be explained below with reference to the block diagram of FIG. 1, the timing chart of FIG. 5, and a flowchart of FIG. 8. The same step numbers as in the flowchart of FIG. 7 denote the same processes in FIG. 8, and a repetitive explanation will be omitted.

In step S805, an image receiving unit 1021 determines whether the input dark image is the first one of dark images (the first dark image) acquired before the start of radiography or a dark image (the second dark image) acquired after the end of X-ray irradiation. If the input dark image is the first or second dark image (YES in S805), the process returns to step S702 to repeat the same processing. If the input dark image is not the second dark image, i.e., if the input dark image is the third dark image acquired by the sensor 1012 when a predetermined time has elapsed after the acquisition of the second dark image (NO in S805), the process advances to step S707. In step S707, a pre-processing unit 1023 executes pre-processing.

In step S808, the image processing parameter control unit 1022 receives the third dark image and the first dark image saved in a dark image saving unit of the image saving unit 104, and calculates the random system noise. More specifically, the image processing parameter control unit 1022 calculates the difference value between the first and third dark images.

In step S809, the image processing parameter control unit 1022 calculates the standard deviation of a whole difference value image obtained as the difference value of a plurality of dark images, thereby calculating the random system noise. The third dark image is used instead of the second dark image because the afterimage of an X-ray image may remain in the second dark image acquired immediately after the X-ray image is acquired. Therefore, the random system noise is obtained more accurately by using the third dark image acquired by the sensor 1012 immediately after the acquisition of the second dark image, or when a predetermined time has elapsed after the acquisition of the second dark image. The image processing parameter control unit 1022 outputs the thus obtained random system noise amount to a noise suppressing unit 1024.

This embodiment can accurately detect the random system noise even when the afterimage component remains in the dark image.

Fifth Embodiment

The fifth embodiment is almost the same as the first embodiment in arrangements and procedures of an X-ray imaging unit 101, image processing unit 102, image display unit 103, and image saving unit 104. The differences from the first embodiment are the driving mode of a sensor 1012, an input image to an image processing parameter control unit 1022, and there is image reprocessing.

Figure 6:
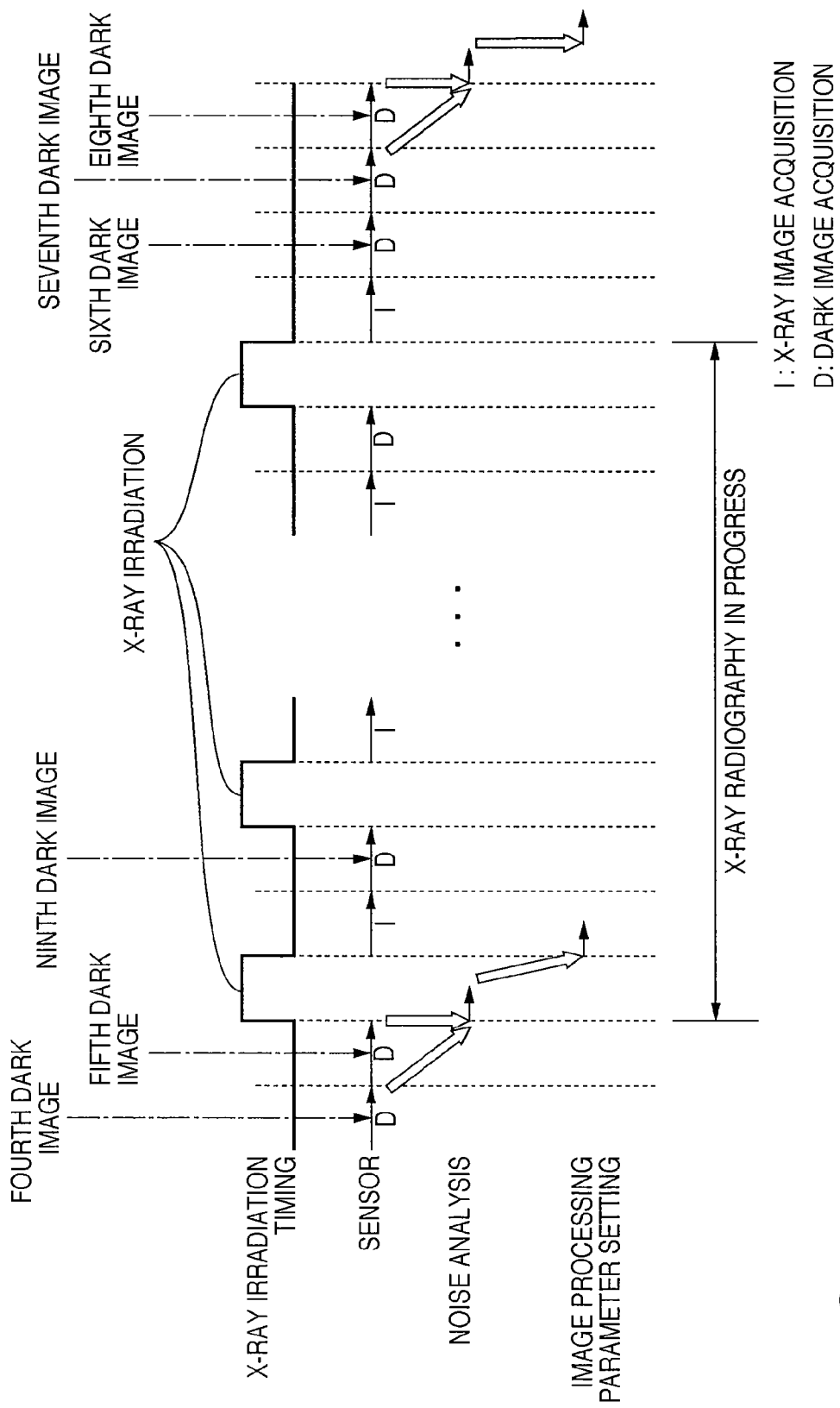
FIG. 6 is a timing chart showing the timings of X-ray irradiation, acquisition of an X-ray image by a sensor, analysis of noise contained in the X-ray image, and image processing parameter setting.

As shown in FIG. 6, the sensor driving mode of the fifth embodiment differs from that of the first embodiment in that the fourth and fifth dark images are acquired before the start of radiography of an X-ray image and the seventh and eighth dark images are acquired after the end of radiography of the X-ray image. The fourth and fifth dark images are respectively the first and second ones of dark images obtained before the start of radiography, and the seventh and eighth dark images are respectively the second and third ones of dark images acquired after the end of radiography of the X-ray image.

These four dark images are input to the image processing parameter control unit 1022. The random system noise detected from the fourth and fifth dark images is used as a pre-radiography random system noise amount. The random system noise amount detected from the seventh and eighth dark images is used as a post-radiography random system noise amount. The image processing parameter control unit 1022 saves the pre- and post-radiography random system noise amounts in the image saving unit 104. A noise suppressing unit 1024 receives the pre-radiography random system noise amount from the image saving unit 104, calculates the random noise amount during radiography, and performs a noise suppressing process.

Figure 9A:
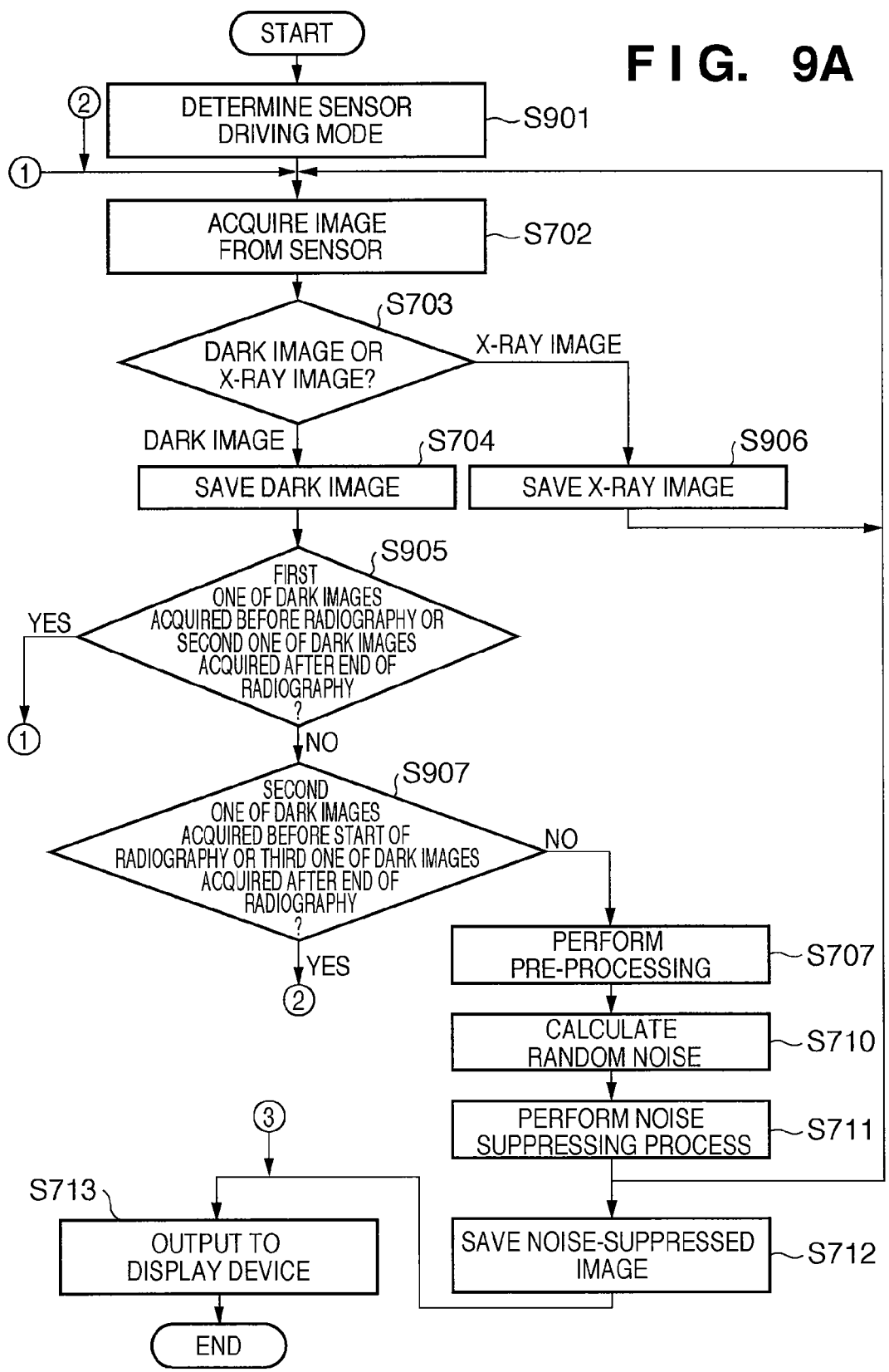
FIGS. 9A and 9B are flowcharts for explaining the operation procedure of an X-ray image processing apparatus.
Figure 9B:
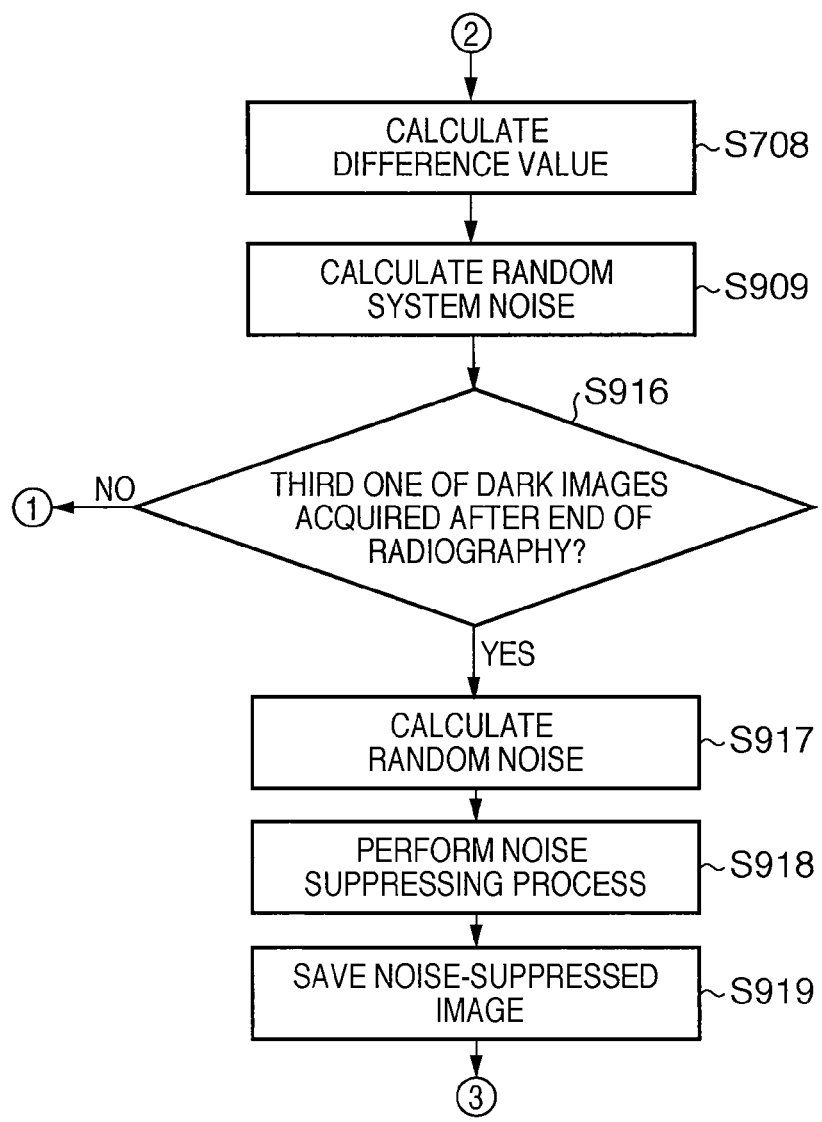

This embodiment performs a noise resuppressing process after the end of radiography. This noise resuppressing process will be explained below with reference to the block diagram of FIG. 1, the timing chart of FIG. 6, and a flowchart of FIGS. 9A and 9B. The same step numbers as in the flowchart of FIG. 7 denote the same processes in the flowchart of FIGS. 9A and 9B, and a repetitive explanation will be omitted.

In step S905, an image receiving unit 1021 determines whether the input dark image is the first one of dark images (the fourth dark image) acquired before the start of radiography or the second one of dark images (the seventh dark image) acquired after the end of radiography. If the input dark image is the first one of dark images acquired before the start of radiography or the second one of dark images acquired after the end of radiography (YES in S905), the process returns to step S702 to execute the same processing.

On the other hand, if it is determined in step S905 that the input dark image is neither the first one of dark images acquired before the start of radiography nor the second one of dark images acquired after the end of radiography (NO in S905), the process advances to step S907. In step S907, the image receiving unit 1021 determines whether the input dark image is the second one of dark images (the fifth dark image) acquired before the start of radiography, or the third one of dark images (the eighth dark image) acquired after the end of radiography. If the input dark image is neither the second one of dark images acquired before the start of radiography nor the third one of dark images acquired after the end of radiography (NO in S907), the process advances to step S707, and the same processes as in the individual steps of FIG. 7 explained in the first embodiment are executed after that. On the other hand, if it is determined in step S907 that the input dark image is the second one of dark images acquired before the start of radiography or the third one of dark images acquired after the end of radiography (YES in S907), the process advances to step S708, and the difference value is calculated in the same manner as in step S708 of FIG. 7. In this embodiment, the difference value is calculated on the basis of the four dark images.

In step S909, the image processing parameter control unit 1022 receives the fifth dark image and the fourth dark image from the image saving unit 104, and calculates the random system noise. Also, the image processing parameter control unit 1022 receives the eighth dark image and the seventh dark image from the image saving unit 104, and calculates the random system noise. When the difference is calculated, fixed pattern noise added to the fourth and fifth dark images and that added to the seventh and eighth dark images are deleted, and only random noise remains.

If it is determined in step S916 that the calculation of the random system noise of the third one of dark images acquired after the end of radiography is not completed (NO in S916), the process returns to step S702 to repeat the same processing. On the other hand, if it is determined in step S916 that the calculation of the random system noise of the third one of dark images acquired after the end of radiography is completed (YES in S916), the process advances to step S917.

In step S917, the noise suppressing unit 1024 first calculates the random noise amount as in the first embodiment. To calculate the random noise, the noise suppressing unit 1024 reads out the post-radiography random system noise amount and pre-radiography random system noise amount from the image saving unit 104, and calculates the post-radiography random noise amount by using these values. More specifically, the random system noise increases from the start of radiography (the start of X-ray irradiation) to the end of radiography (the end of X-ray irradiation). Assuming that the random system noise increases as a function F(N) of a frame N, the random system noise amount in each frame being radiographed is estimated (interpolated). If F(N) is linear, random system noise $N_s(n)$ in each frame being radiographed is represented by equation (7) below. On the basis of the interpolated random system noise amount, the image processing parameter control unit 1022 changes a parameter for processing an X-ray image. On the basis of the changed parameter, the noise suppressing unit 1024 can perform image processing on the X-ray image saved in the image saving unit 104.

$$N_s(n) = \frac{N_{s\_fin}}{N_{s\_start}} \cdot n + C \qquad (7)$$

where $N_{s\_fin}$ is the post-radiography random system noise amount, $N_{s\_start}$ is the pre-radiography random system noise amount, and C is a coefficient. The random noise amount in each frame is calculated from equations (1) and (2) by using the obtained random system noise $N_s(n)$.

In step S918, the noise suppressing unit 1024 receives the pre-processed image from the image saving unit 104, and performs a noise suppressing process by using the obtained random noise amount, thereby forming a noise-resuppressed image (post-radiography parameter noise-suppressed image).

In step S919, the noise suppressing unit 1024 saves the post-radiography parameter noise-suppressed image as a noise-resuppressed image in the image saving unit 104.

By thus performing the noise resuppressing process after radiography, it is possible to reduce noise amount calculation errors caused by an afterimage on a dark image, and reduce the overall processing load on the system. Since an image obtained by a more appropriate noise suppressing effect is saved as the noise-resuppressed image, the clearness can be further improved when a doctor performs diagnosis by cineloop reproduction or the like.

Sixth Embodiment

In the first to fourth embodiments, the image processing parameter control unit 1022 operates and calculates the random system noise whenever the sensor 1012 acquires an X-ray image, i.e., for each frame. However, it is also possible to calculate the random system noise for each predetermined cycle without calculating the random system noise for each frame. When a control PC 1011 of an X-ray imaging unit 101 inputs information of the predetermined cycle to an image processing unit 102, an image processing parameter control unit 1022 operates and calculates the random system noise on the basis of this cycle information. The predetermined cycle herein mentioned is the number of frames or a predetermined time. The image processing parameter control unit 1022 can operate for every predetermined number of frames or every predetermined time input as the predetermined-cycle information. When the image processing parameter control unit 1022 is not in operation, a noise suppressing unit 1024 executes a noise suppressing process by using the random system noise used in a preceding frame.

This embodiment can perform X-ray image processing with higher accuracy by suppressing the influence of the random system noise by calculating it for each predetermined cycle.

Seventh Embodiment

In the first to fourth embodiments, the image processing parameter control unit 1022 operates and calculates the random system noise whenever the sensor 1012 acquires an X-ray image, i.e., for each frame. However, it is also possible to calculate the random system noise when the sensor read modes of the sensor 1012 are switched, instead of calculating the random system noise for each frame.

Figure 10:
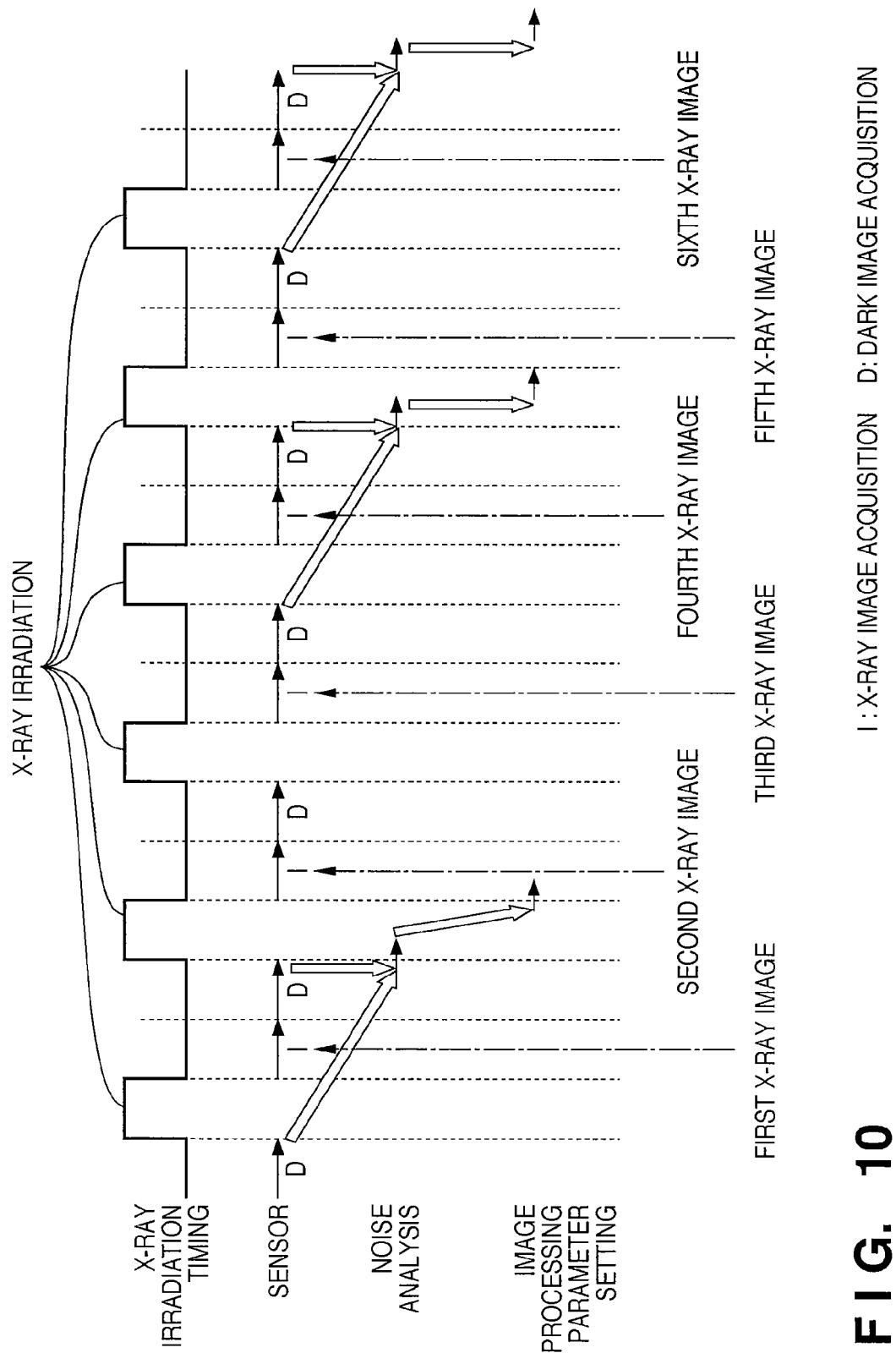
FIG. 10 is a timing chart showing the timings of X-ray irradiation, acquisition of an X-ray image by a sensor, analysis of noise contained in the X-ray image, and image processing parameter setting.

FIG. 10 is a timing chart pertaining to the X-ray irradiation timing, the operation of a sensor 1012, noise analysis, and image processing parameter setting according to the seventh embodiment. As in the first to fourth embodiments, an image processing parameter control unit 1022 operates and detects the random system noise of the first X-ray image. For the second X-ray image, the sensor read mode of the sensor 1012 remains unchanged from that for the first X-ray image. Accordingly, the image processing parameter control unit 1022 does not operate, and a noise suppressing unit 1024 performs a noise suppressing process by using the random system noise detected as the random system noise of the first X-ray image. Since the sensor read mode of the sensor 1012 remains unchanged for the third X-ray image as well, the same processing as that for the second X-ray image is performed.

Assume that the sensor read mode of the sensor 1012 is changed when acquiring the fourth X-ray image. More specifically, this change in sensor read mode includes, e.g., a change in number of lines to be added when reading out data from the sensor, and a change in read area when reading out data. A control PC 1011 of an X-ray imaging unit 101 notifies an image processing unit 102 of the change in sensor read mode. Upon receiving this notification, the image processing parameter control unit 1022 calculates the random system noise and changes a parameter. The noise suppressing unit 1024 executes image processing including a noise suppressing process by using the newly changed parameter. For the fifth X-ray image, the image processing parameter control unit 1022 does not operate because the sensor read mode of the sensor 1012 remains unchanged. For the sixth X-ray image, the sensor read mode of the sensor 1012 is changed, so the image processing parameter control unit 1022 calculates the random system noise and changes the parameter in the same manner as for the fourth X-ray image. The noise suppressing unit 1024 executes image processing including the noise suppressing process by using the newly calculated parameter.

This embodiment can perform X-ray image processing by suppressing the influence of the random system noise by calculating it by using the dark image radiographed at the timing at which the sensor read mode changes.

Eighth Embodiment

In the above embodiments, when the X-ray fluoroscopic apparatus is in operation, the sensor 1012 acquires a dark image at a predetermined timing, and the image processing parameter control unit 1022 calculates the random system noise. However, the dark image acquisition timing is not limited to the timing when the X-ray fluoroscopic apparatus is in operation, and may also be the timing when the apparatus is in a radiography standby state. Also, the dark image acquisition timing is not limited to the timing corresponding to the sensor driving mode. That is, the sensor 1012 can also acquire two dark images at timings at equal intervals or unequal intervals. "Timings at equal intervals" means that a predetermined time interval is used as the dark image acquisition timing. "Timings at unequal intervals" means that the occurrence of an irregular event is used as the dark image acquisition timing. Examples are the timing when the power supply of the sensor 1012 or X-ray fluoroscopic apparatus is turned on, the timing immediately after the X-ray fluoroscopic apparatus is calibrated, and the timing immediately before the calibration.

The timings at unequal intervals also include the timing when the radiographic environment changes, e.g., when the installation location of the X-ray fluoroscopic apparatus moves to another installation location. The sensor 1012 acquires two dark images at these timings, and the image processing parameter control unit 1022 calculates the random system noise. The noise suppressing unit 1024 can execute a noise suppressing process by using the random system noise based on the dark images acquired at arbitrary timings, e.g., in the radiography standby state, at the timings at equal intervals, or at the timings at unequal intervals.

This embodiment can perform X-ray image processing by suppressing the influence of the random system noise by calculating it by using the dark images acquired at arbitrary timings by the sensor.

Other Embodiments

Note that the object of the present invention can also be achieved by supplying, to a system or apparatus, a computer-readable storage medium recording a program code of software that implements the functions of the embodiments described above. Note also that the object of the present invention can be achieved by a computer (or a CPU or MPU) of the system or apparatus by reading out the program code stored in the storage medium and executing the readout program code.

In this case, the program code itself read out from the storage medium implements the functions of the above embodiments, and the storage medium storing the program code constitutes the present invention.

As the storage medium for supplying the program code, it is possible to use, e.g., a flexible disk, hard disk, optical disk, magnetooptical disk, CD-ROM, CD-R, nonvolatile memory card, or ROM.

Furthermore, the functions of the aforesaid embodiments are implemented by the computer by executing the readout program code. The present invention of course also includes the case where the OS (Operating System) or the like running on the computer performs part or the whole of actual processing on the basis of instructions by the program code, and the above-mentioned embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-031023, filed Feb. 12, 2008, which is hereby incorporated by reference herein in its entirety.

What is claimed is:

1. An X-ray image processing apparatus comprising:
a setting unit adapted to set a parameter for processing an X-ray image acquired by an X-ray receiving unit in order to decrease a noise of the X-ray image on the basis of a difference value of a first dark image and a second dark image, wherein the first dark image is acquired when no X-rays are irradiated and before the X-ray image is acquired, and the second dark image is acquired when no X-rays are irradiated and after the X-ray image is acquired; and
an image processing unit adapted to perform image processing on the X-ray image on the basis of the parameter set by said setting unit.

2. The apparatus according to claim 1, further comprising a calculating unit adapted to calculate a noise of the X-ray receiving unit on the basis of a difference value of a plurality of dark images acquired at different timings by said X-ray receiving unit when no X-rays are irradiated,
wherein said calculating unit interpolates the noise from start to end of X-ray irradiation on the basis of a difference value of a plurality of dark images acquired by said X-ray receiving unit at different timings before start of X-ray irradiation, and a difference value of a plurality of dark images acquired by said X-ray receiving unit at different timings after end of X-ray irradiation.

3. The apparatus according to claim 2, further comprising an image saving unit adapted to save an X-ray image acquired by said X-ray receiving unit from start to end of X-ray irradiation,
wherein said setting unit sets the parameter for processing the X-ray image on the basis of the noise interpolated by said calculating unit, and
said image processing unit performs image processing on the X-ray image saved in said image saving unit, on the basis of the parameter set by said setting unit.

4. The apparatus according to claim 2, wherein said calculating unit calculates the noise by performing a filtering process on the difference value of a plurality of dark images by using a high-pass filter.

5. An X-ray image processing method of an X-ray image processing apparatus, said method comprising:
a setting step of setting a parameter for processing an X-ray image acquired by an X-ray receiving unit in order to decrease a noise of the X-ray image on the basis of a difference value of a first dark image and a second dark image, wherein the first dark image is acquired when no X-rays are irradiated and before the X-ray image is acquired, and the second dark image is acquired when no X-rays are irradiated and after the X-ray image is acquired; and
an image processing step of performing image processing on the X-ray image on the basis of the parameter set in the setting step.

6. A non-transitory computer-readable storage medium storing a computer program which makes a computer execute an X-ray image processing method defined by claim 5.

* * * * *